United States Patent [19]

Kim

[11] Patent Number: 5,155,158

[45] Date of Patent: Oct. 13, 1992

[54] MOLDABLE CERAMIC COMPOSITIONS

[75] Inventor: Hongkyu Kim, Basking Ridge, N.J.

[73] Assignee: Hoechst Celanese Corp., Somerville, N.J.

[21] Appl. No.: 432,698

[22] Filed: Nov. 7, 1989

[51] Int. Cl.$^5$ ................................................ C08K 3/00
[52] U.S. Cl. ..................... 524/424; 524/428; 524/430; 524/431; 524/435; 524/438; 524/439; 264/63; 264/125
[58] Field of Search ................... 264/63, 125; 524/424, 524/428, 430, 431, 435, 438, 439

[56] References Cited

U.S. PATENT DOCUMENTS

| | | | |
|---|---|---|---|
| 4,624,812 | 11/1986 | Farrow et al. | 264/63 |
| 4,929,575 | 5/1990 | Khovry et al. | 501/137 |
| 4,980,109 | 12/1990 | Yamamoto et al. | 264/135 |

OTHER PUBLICATIONS

*International Journal of High Technology Ceramics,* Elsevier Applied Science Publishers, vol. 2, 1986, pp. 1–31.

*Primary Examiner*—Stephen J. Lechert, Jr.
*Attorney, Agent, or Firm*—Michael W. Ferrell

[57] ABSTRACT

A ceramic composition which can be extrusion or injection molded to ceramic greenbodies comprises a sinterable powder mixed within a polyacetal binder and further includes a dispersing aid comprising a polyester oligomer formed by self condensation of a hydroxy fatty acid in which the hydroxy group is attached to an internal carbon atom of the fatty acid. The dispersing aid also acts as a stabilizer for the polyacetal binder during compounding with the powder.

15 Claims, No Drawings

MOLDABLE CERAMIC COMPOSITIONS

BACKGROUND OF THE INVENTION

The present invention relates to improved extrusion and injection moldable ceramic compositions. More particularly, the present invention is directed to novel extrusion and injection moldable ceramic compositions containing ceramic or metal powder and a polyacetal binder.

Ceramic materials are of critical importance for a number of high temperature, high performance applications. Recently, there has been substantial interest in the development of ceramic compositions for critical engine parts including reciprocating engines, gas turbine and rocket engines. These applications require a unique combination of properties such as high specific strength, high temperature mechanical property retention, low thermal and electrical conductivity, hardness and wear resistance, and chemical inertness. However, the inability to produce complex shapes of high dimensional accuracy and sufficient strength using an economical fabrication technique has prevented ceramic materials from fulfilling their potential in these critical high temperature, high performance applications.

Several processes have been used in an attempt to form ceramic bodies. Among such processes include pressing ceramic powder into a greenbody followed by sintering or by hot pressing and subsequently shaping or machining the sintered body to produce the finished product. Another technique is slip casting in which the ceramic particles are dispersed in water, the slurry placed in a mold and the water removed to form a greenbody. The pressing techniques have been found unsuitable to form ceramic articles of complex shapes and which must meet specific design specifications. The slip casting technique is time consuming and has not yielded greenbodies of sufficient strength.

In view of the problems associated with the prior techniques, injection molding has been increasingly used to form ceramic articles. Injection molding is a process wherein a moldable composition is forced into a mold or die. The injection molding process facilitates a rapid and repeated forming of a plurality of articles having a consistency with close dimensional tolerance. The injection molding process also minimizes the amount of shaping or machining that may be required to produce a finished article.

The injection molding process typically involves forming a ceramic greenbody by injection molding a composition comprising ceramic powder dispersed within a thermoplastic polymer, burning out the polymer, and sintering the resulting porous greenbody to a dense ceramic part with the same shape. The thermoplastic binder acts as a fluidizing agent to distribute the injection pressure throughout the mold and as the material which holds the ceramic particles in the shape of the mold after the part is ejected. A typical ceramic powder/thermoplastic polymer composite has a very high content of the ceramic particles, typically from about 50 to about 87 volume % and a minimum of the binder material to hold the particles together in desired shape. A useful binder material for ceramic injection molding is a polyacetal resin as disclosed in U.S. Pat. No. 4,624,812, the entire contents of which are herein incorporated by reference.

A typical injection moldable ceramic composition will also contain a minor binder component which is often a thermoplastic, wax or oil, plasticizers which increase the fluidity of the ceramic-binder mixture, and processing aids such as surfactants which improve the wetting characteristics between the plastic binder and ceramic during mixing to form the composite.

A summary of injection molding applied to the fabrication of molded ceramic bodies is provided in an article entitled "Review: Fabrication of Engineering Ceramics by Injection Molding. I. Materials Selection", M. J. Edirisinghe et al, *International Journal of High Technology Ceramics, Vol. II*, 1986, pp. 1-31.

One of the advantages of using a polyacetal binder in an injection moldable ceramic composition is its relatively easy ability to undergo thermal degradation during the binder removal process. Thus, it has been found that the time for binder removal can be drastically reduced when a polyacetal resin is used as the binder. However, the property which renders the polyacetal binder to readily undergo thermal degradation also renders it difficult to produce defect-free parts when the binder removal process is shortened. For example, it has been found that the relatively easy ability of the polyacetal resin to degrade to low molecular weight fragments upon heating can be disadvantageous during the steps of compounding the ceramic powders with the polyacetal binder. During compounding, the ceramic powders generate a high shear, which can cause a premature degradation of the polyacetal binder. The ceramic green bodies thus formed may contain internal voids or cracks due to premature off-gassing and be of insufficient strength to maintain full integrity during handling subsequent to the molding operation. The premature degradation of the polyacetal binder, thus, may ultimately reduce the density and strength of the ceramic article.

Another difficulty found in processes for molding ceramic compositions is yielding a uniform mix of the sinterable powder within the binder in view of the high level of ceramic or metal power which is present in the composition. Thus, the high torque needed for compounding the sinterable powder with the binder can push the typical compounding apparatus beyond its functional limits. Besides damaging equipment, often powder agglomerates or dry areas devoid of binder are present in the composition. Difficulties in filling the mold and consequent deformed parts or internal cracks or voids are the result. While it is known, in general, to add wetting agents or surfactants to the injection moldable ceramic composition, there is still a need in this art to find particular dispersing aids which will uniformly disperse the ceramic within the binder and which can aid in reducing the torque and viscosity of the composition to allow homogeneous mixing of the ceramic and binder components.

Accordingly, it is an object of the present invention to provide an extrusion or injection moldable ceramic composition containing a polyacetal binder which has improved polyacetal stability during the compounding of the ceramic powder with the binder.

It is a further object of the present invention to provide a moldable ceramic composition containing a polyacetal binder which has improved dispersion of the ceramic powder within the polyacetal binder during compounding.

It is still a further object of the present invention to provide a moldable ceramic composition containing a polyacetal binder which has both improved stability of the polyacetal binder during compounding and improved dispersion of the ceramic powder within the polyacetal binder.

Yet another object of the present invention is to provide a process for producing ceramic articles by extrusion or injection molding ceramic compositions containing a ceramic or metallic powder dispersed within a polyacetal binder into ceramic green bodies, treating the green bodies such as by heating or contacting with solvent to remove the binder and then sintering or reaction bonding the green body to yield defect-free and carbon-free ceramic parts.

SUMMARY OF THE INVENTION

In accordance with the present invention, extrusion or injection moldable ceramic compositions are provided which comprise a sinterable powder, a polyacetal binder and a polyester oligomer derived from a long chain fatty acid containing an internal hydroxy functional group. The polyester oligomer acts as both a dispersant for the sinterable powder within the polyacetal matrix and provides stability to the polyacetal to reduce the degradation of the polyacetal binder during compounding.

DESCRIPTION OF THE PREFERRED EMBODIMENTS

The present invention relates to an essentially solvent free ceramic composition suitable for extrusion and injection molding. The ceramic powder employed in the moldable compositions of this invention is selected according to the designed function of the molded article as is known to those with skill in the art. Typical ceramic powders include aluminum oxide ($Al_2O_3$); zirconium oxide (preferably calcium oxide-stabilized $ZrO_2$), silicon dioxide (preferably fused $SiO_2$), silicon nitride ($Si_3N_4$), silicon carbide (SiC), silicon, ferrite and mixtures thereof.

To obtain a sintered molded article which exhibits excellent characteristics, the ceramic powder should be selected and/or treated such that close packing of powder particles may be obtained. In particular, important factors for particle packing are particle size distribution and the degree of agglomeration. To obtain optimum packing, a broad distribution of particle sizes is desirable as is well known to those having ordinary skill in the art.

The degree of agglomeration is a function of the size of the individual particles. The smaller the particle size, the greater the surface attraction and strength of electrostatic forces which leads to a higher degree of agglomeration. While the specific particle size employed will depend on the chemical compound selected for the ceramic powder and the function of the molded article, the average particle size will typically be in the range of from about 0.1 to about 30 microns, preferably from about 0.5 to about 10 microns. The shape of the individual particles also effects agglomeration with spheres yielding the greatest density, cylindrical rods with slightly lowered density and dagger-shaped fibers with yet lower density.

In the interest of completeness, it should be pointed out here that powder packing is also affected by the particle array. However, since this is principally a random occurrence in the context of the present invention, a further discussion of this factor is not believed to be warranted.

In the event that the particles of the available ceramic powder are too large or are of a shape which yields a low packing density, treatment of the powder may lead to improved results. Such treatment may be accomplished through either wet or dry ball milling, jet milling with the particles propelled by gas to promote impact thereof, or other types of milling techniques whereby the particle size is reduced and the particle shape altered. Thus, for example, aluminum oxide available from Alcoa (A16SG) may be ball milled with 0.5% oleic acid to reduce the degree of agglomeration. Similarly, milling of needle-shaped particles of silicon nitride will improve the packing density. However, in this instance, care should be taken such that the degree of agglomeration of the milled silicon nitride is not increased to an extent whereby the overall improvement is negligible.

The ceramic composition of the present invention also includes a binding agent in an amount ranging from about 10 to 50%, preferably from about 15 to about 35% by weight of the total mixture which serves to maintain the integrity of the shaped article prior to sintering. The binding gent is a polyacetal having the recurring unit $-OCH_2-$ and will preferably contain at least 50 mole % of such oxymethylene recurring units The term "polyacetal" and the recurring unit should be understood to encompass both homopolymers and copolymers which will be discussed in detail below.

The polyacetals employed in the present invention are per se known in the art For example, polyacetals commercially available under the registered trademark Celcon may be prepared by polymerizing trioxane in accordance with teachings of U.S. Pat. No. 3,027,352, the contents of which are hereby incorporated by reference.

The polyacetal binding agents of the present invention yield numerous advantages. In particular, since the polyacetals depolymerize to low molecular weight formaldehyde through unzipping of the polymer chain, heating causes a uniform evolution of volatiles which removes the polyacetal binding agent without causing disruptions in the structure that might otherwise lead to defects or weak spots in the molded article. Additionally, the volatile material is a clean burning fuel that does not leave any undesirable or difficultly removable residue.

A yet further significant advantage of the use of polyacetals as the binding agent is that by selecting certain comonomers, copolymer binding agents may be tailored to the specific ceramic powder employed. More specifically, trioxane can be polymerized with ethylene oxide, dioxolane, substituted dioxolanes, trioxepane and 1,4-dioxane in amounts ranging from about 2 to about 80 mole % of the total comonomers present. Such copolymers can provide a lower melting point, lower crystallinity and increased softness and flexibility. For instance, by copolymerizing dioxolane with trioxane in substantially equimolar proportions, a copolymer binding agent which is particularly suitable for aluminum oxide ceramic powder may be obtained.

The binding agent may also be comprised of small amounts of from about 1.0 to about 10% by weight of known materials which serve an additional binding function. Such materials include low density polyethylene, atactic polypropylene, ethylene vinyl acetate and waxes such as stearic acid and paraffin wax.

To improve the dispersion of the sinterable powder within the polyacetal binder and to improve the stability of the polyacetal binder during the compounding stage, the moldable ceramic composition of the present invention includes an effective amount of a polyester oligomer derived from a long chain fatty acid which contains an internal hydroxy functional group. The hydroxy functional fatty acid which is condensed to form the oligomer should contain at least about 12 carbon atoms and typically will be a fatty acid containing from about 12 to 36 carbon atoms. A preferred hydroxy functional fatty acid is one which contains 18 carbon atoms, i.e., hydroxy stearic acid. In the hydroxy fatty acid monomers which form the polyester oligomers useful in this invention, the hydroxy functional group is attached to an internal carbon. By this, it is meant that the hydroxy is not attached to an end carbon unit and, it is preferred that the hydroxy functionality not be located within four carbons at either end of the fatty acid. The polyester oligomer may contain amide functionality in small amounts, i.e., less than about 5 mole %. An example of a polyester oligomer which is useful in this invention is Hypermer KD3 manufactured by ICI Chemicals.

The polyester oligomer dispersant and stabilizer of this invention is present in minor amounts relative to the polyacetal binder. Thus, the moldable ceramic compositions of this invention will contain from about 1 to 10 vol. % of the polyester oligomer, preferably from about 2.5 to 5 vol. % based on the total volume of the composition.

In addition to the ceramic powder, binding agent and dispersant, the ceramic composition of the present invention may further contain conventional amounts of other wetting agents, plasticizers and other types of processing aids which are added to the composition to obtain a suitable rheological system for molding. Specifically, from about 0.1 to about 5.0% by weight of additional wetting agents or surfactants can promote adhesion between the ceramic powder and the binding agent thereby reducing the degree of agglomeration. Suitable wetting agents or surfactants include lignite, mineral oil and low molecular weight waxes. Plasticizers in an amount of from about 1.0 to about 10% by weight decrease the viscosity of the composite to promote mixing. Typical plasticizers include waxes, silicones, alkyl phthalates, polyalkylene (e.g., polyethylene) glycols and linear saturated polyesters. Mold release agents in an amount of from about 0.05 to about 2.0% by weight prevent adhesion to the mold wall thereby facilitating removal of the shaped article from the mold. Typical mold release agents include silicones and various phthalates and amides such as Acrawax C and Hoechst Microwax C (fatty acid amides).

To mold the ceramic composition into shaped articles, the selected ceramic powder may be added and mixed with both the binding agent and polyester oligomer dispersant. Alternatively, the powder may be initially mixed with the polyester oligomer dispersant of this invention prior to mixing with the polyacetal binder. Also present or added subsequently are any other additives which are to be included in the composition. Mixing of the ceramic powder, the binding agent and any additives is performed in the absence of oxygen to preclude oxidation of the ceramic powder. This may be achieved by conducting the mixing operation in a vacuum or under an inert atmosphere such as nitrogen or argon.

To obtain a homogenous mixture, the components of the composition are first mixed with low shear at a temperature of from about room temperature to about 200° C. for from about 5 minutes to about 60 minutes. The composition is then sheared in this temperature range for from about 5 to about 60 minutes. If the mixture has been heated, it is thereafter cooled, while mixing under shear is continued. For example, the temperature is reduced from about 200° to about 170° C. The resulting mixture should have a viscosity of less than about 1,000 poise at a shear rate of 1,000 sec$^{-1}$ as measured by a capillary rheometer at a temperature in the range of from about 100° to about 300° C.

The mixture is next extruded at a die temperature in the range of from about 190° to about 220° C. and a pressure in the range of from about 500 to about 2000 psig. Extrusion can be achieved by various pieces of equipment known to those of ordinary skill in the art.

Alternatively, a mixer-extruder may be employed which intimately mixes the components of the composition in a substantial absence of air and then extrudes the mixture.

Subsequent to the extrusion step, the extrudate is chipped or chopped to obtain pieces of the composition which are in the range of from about 1/16 to about ¼ inch in maximum dimension. While extrusion and chipping may be eliminated and the composition directly extrusion or injection molded, it is preferably extruded and then chipped or chopped into pieces which may be readily fed into a hopper feeder of a conventional extruder or injection molding machine. The chipped composition is then heated to a temperature from about 175° to about 200° C., and injected at a pressure in the range from about 500 to about 1000 psig. into a cold mold (i.e., from about room temperature to about 150° C.) where the composition hardens. Pressure is maintained on the composition until hardening is achieved. Typically, this requires from about 20 to about 60 seconds.

To remove the binding agent and any volatile additives, the molded composition is gradually heated. Although the rate and final temperature will depend on the amount and type of components in the composition and the characteristics of the article, a typical rate of temperature increase will range from about 5° C. to about 20° C. per hour until a temperature in the range of from about 100° C. to about 300° C. is reached. The selected temperature is then maintained for from about 0.5 to about 2.0 hours.

The temperature is then raised to that required for sintering the ceramic powder. While the rate of final temperature will naturally depend upon the characteristics of the ceramic powder and the shaped article, a rate of temperature increase will generally be in the range of from about 50 to about 1000 degrees per hour until a temperature at a range from about 1000° to about 1800° C. is obtained. To fully sinter the ceramic powder, the shaped article is held at final temperature for about 15 minutes to about 8 hours. Sintering is generally undertaken in an atmosphere composed of air or an inert gas.

By the present invention, various sintered articles may be prepared. Such articles include electrical insulators, furnace elements, crucibles, heat exchange tubes, molds and cores for metal casting and other applications known to those of ordinary skill in the art.

To obtain a more complete understanding of the present invention, the following examples of preparing shaped molded articles is set forth. It should be understood, however, that the invention is not limited to the specific details set forth therein.

EXAMPLES 1-8

Various injection moldable ceramic compositions were formulated and tested for the ability of the ceramic powder to uniformly mix with the polyacetal binder and for the presence of any degradation of the binder.

All formulations included a silicon powder, Kema Nord 4B, mean particle size of 25 microns and a surface area of 0.4 m²/g. The polyacetal binder was Celcon M450, a polyacetal copolymer from Hoechst Celanese, comprising about 98 mol % oxymethylene units and about 2 mol % oxyethylene units and having a melt index of 45.0 g/10 min. Each of the compositions also included a polyethylene glycol plasticizer, Carbowax PEG 800, Union Carbide and a mold lubricant of either Hoechst Microwax C, ethylene bis-stearoylamide or Kermide S, stearamide, Humko. The compositions varied by the addition of various dispersing aids including the polyester oligomer of the present invention, Hypermer KD3, and control dispersants including a titanate coupling agent, LICA 44, Kenrich and stearic acid.

All the formulations were mixed in a Brabender Plasti-cord Torque Rheometer (PLD 651) with a small mix head and roller blades at a temperature of about 180° C. and 50 rpm. In all samples, the silicon powder was initially mixed with the dispersing aid prior to the addition of the plasticizer, mold release agent and polyacetal binder. Mixing times ranged from about 45 min. to 1 hour.

The individual compositions, the mixing torque and mixing quality of each of the compositions of Examples 1-8 are set forth in Table 1.

TABLE 1

| | SILICON/CELCON COMPOUNDS FORMULATIONS | | | |
|---|---|---|---|---|
| Ex. No. | Compositions | (vol %) | Mixing Torque (m-g) | Mixing Quality[1] |
| 1 | Si/Celcon/PEG/ Wax C/KD3 | (67/20/5/4/4) | 300 | no degradation |
| 2 | Si/Celcon/PEG/ Wax C/LICA44 | (67/20/5/4/4) | 1250 | degradation |
| 3 | Si/Celcon/PEG Wax C/SA | (65/22/5/4/4) | 236 | dry/stiff material |
| 4 | Si/Celcon/PEG Wax C/KD3 | (65/22/5/4/4) | 360 | better consistency |
| 5 | Si/Celcon/PEG/ Kema.S/SA | (65/23/6/2/4) | 670 | degradation & dry consistency |
| 6 | Si/Celcon/PEG/ Wax C/KD3 | (65/23/6/2/4) | 940 | no degradation/ good consistency |
| 7 | Si/Celcon/PEG Wax C/KD3 | (65/23/6/2/4) | 1000 | good consistency |
| 8 | Si/Celcon/PEG/ Kema.S/SA | (65/23/6/2/4) | 620 | degradation & dry consistency |

Celcon = Celcon M450, PEG = Carbowax PEG8000, Wax C = Hoechst Wax C, SA = stearic Acid, LICA 44 = Neoalkoxy Titanate Coupling Agent, Kema.S = Kemamide S = Stearamide
[1]Degradation means severe off-gassing of formaldehyde. Good consistency means good compound which can be injection molded. Dry consistency means poorly mixed compound which still contains dry powders.

As can be seen from Table 1, each of the formulations which contained the polyester oligomer of the present invention was free from degradation while those compositions which contained the other dispersing aids showed some degradation and a poor quality of mixing relative to the compositions of the present invention.

What is claimed is:

1. An essentially solvent-free ceramic molding composition comprising a sinterable powder, a polyacetal binder and a dispersing aid comprising a polyester oligomer formed by self condensation of a hydroxy fatty acid in which the hydroxy group is attached to an internal carbon atom of said fatty acid.

2. The composition of claim 1 wherein said hydroxy fatty acid contains from about 12 to 36 carbon atoms.

3. The composition of claim 2 wherein said hydroxy group is not contained within the 4 carbon atoms from the end of the fatty acid chain.

4. The composition of claim 1 wherein said dispersing aid is formed from hydroxy stearic acid.

5. The composition of claim 4 wherein said hydroxy group is not contained within the 4 carbon atoms from the end of the fatty acid chain.

6. The composition of claim 1 wherein said polyester oligomer contains amide groups.

7. The composition of claim 1 wherein said dispersing aid is present in amounts of from about 1 to 10 vol. %.

8. The composition of claim 7 wherein said dispersing aid is present in amounts of from about 2.5 to 5 vol. %.

9. The composition of claim 1 wherein said polyacetal binder comprises oxymethylene units.

10. The composition of claim 9 wherein said polyacetal contains at least 50 mol % oxymethylene units.

11. The composition of claim 9 wherein said polyacetal is a copolymer containing oxymethylene units and oxyalkylene units wherein said alkylene group contains at least 2 carbon atoms.

12. The composition of claim 11 wherein said polyacetal binder comprises a copolymer containing at least 50 mol % oxymethylene units and the remainder oxyethylene units.

13. The composition of claim 1 wherein said sinterable powder is selected from the group consisting of aluminum oxide, zirconium oxide, silicon dioxide, silicon nitride, silicon carbide, silicon, ferrite and mixtures thereof.

14. The composition of claim 13 wherein said sinterable powder is silicon.

15. The composition of claim 1 wherein said polyacetal binder comprises from about 10 to 50 wt. % of said ceramic composition.

* * * * *